(No Model.)
F. B. WOOD.
HOTEL INDICATOR.
No. 454,924. Patented June 30, 1891.
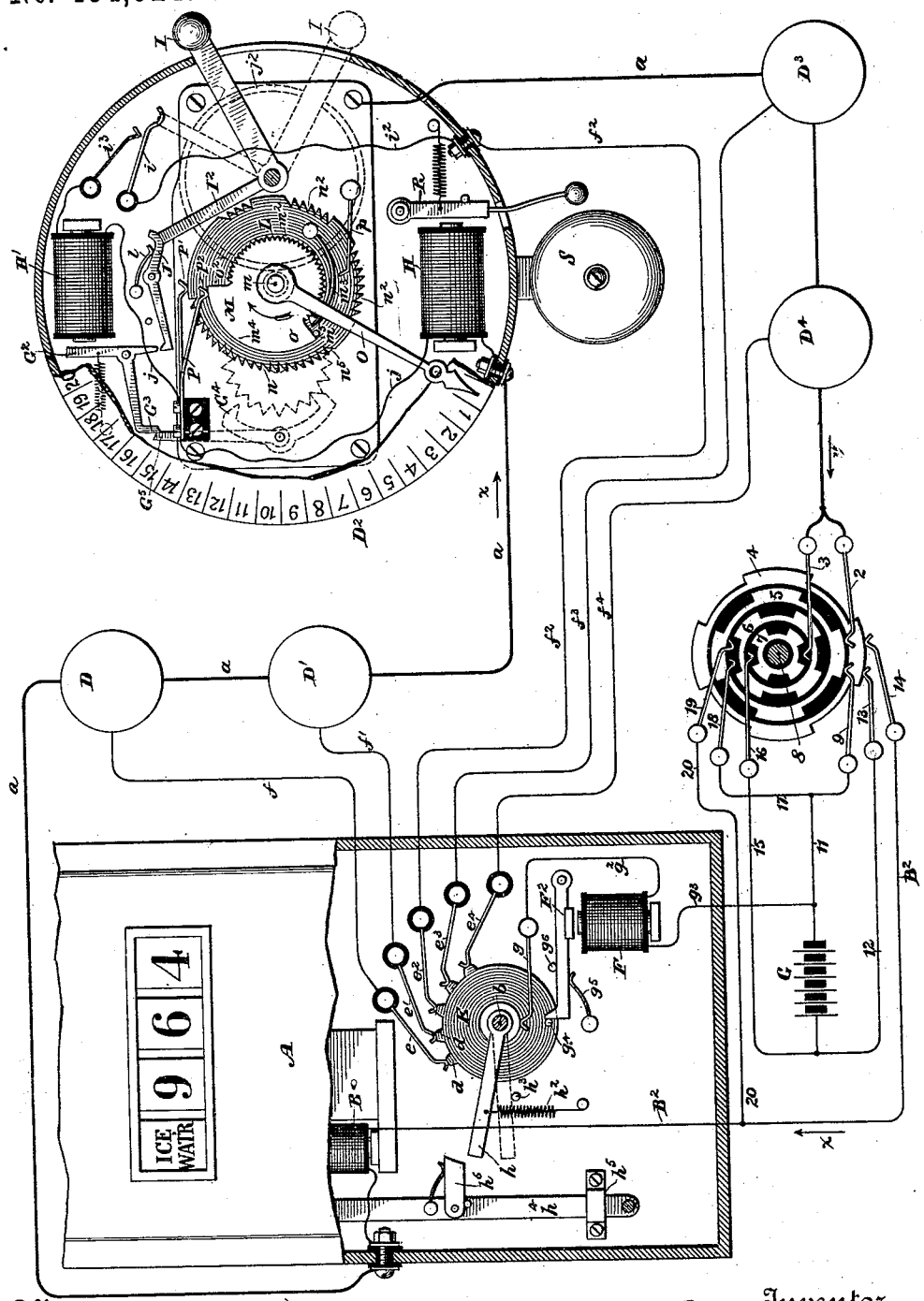
Witnesses
Geo. W. Breck.
C. E. Ashley
Inventor
Frank B. Wood
By his Attorney
T. F. Bourne

UNITED STATES PATENT OFFICE.

FRANK B. WOOD, OF NEW YORK, N. Y., ASSIGNOR TO THEODORE W. BAYAUD, OF SAME PLACE.

HOTEL-INDICATOR.

SPECIFICATION forming part of Letters Patent No. 454,924, dated June 30, 1891.

Application filed August 2, 1890. Serial No. 360,779. (No model.)

*To all whom it may concern:*

Be it known that I, FRANK B. WOOD, of New York city, New York, have invented certain new and useful Improvements in Hotel-Indicators and the Appliances Connected Therewith, of which the following is a specification.

This invention relates to a recording system or indicators for hotels and other places and to the instruments for transmitting the call of want and the number of the room, station, or instrument; also, to means for sending a signal from the main station back to the transmitting-instrument to indicate a fire or give other information.

The object of my invention is to permit but one call at a time to be received by the indicator even though a number of transmitting-instruments in circuit with the indicator be started at the same moment, wherein the transmitter nearest to the register will send in its call and all the other transmitters that have been started will be held in check until said first-mentioned instrument's call has been received, and then the next nearest instrument will operate to send in its call, and so on consecutively through the series of instruments in circuit that may have been started.

Another object of my invention is to permit a signal to be sent from the main receiving-station back over the ordinary receiving-wires to the transmitting-instruments to give a signal in the various rooms in case of fire, accident, or the like to notify the occupants of the rooms.

A further object of my invention is to simplify and improve the mechanism of the transmitting-instrument and parts of the indicator, so as to accomplish the results above specified in an effectual and simple manner.

The invention consists in the novel details of improvement that will be more fully hereinafter set forth, and then specifically pointed out in the claims.

Reference is to be had to the accompanying drawing, forming part hereof, which is an elevation, partly in section, showing an indicator and my improvements applied thereto, and also one of my improved transmitting-instruments by which the results heretofore specified are attained.

Referring now to the drawing, the letter A indicates an indicator, which may be of suitable construction, and B is the magnet by which the mechanism of the register (not shown) is controlled.

D, D', $D^2$, $D^3$, and $D^4$ are transmitting-instruments to be situated in various rooms of the hotel or in other places, and all are connected with the magnet B of the register through the line-wire $a$. The mechanism of only one of the transmitting-instruments is shown, it being understood that the mechanism of the others is substantially similar.

Within or connected with the register A is a circuit-breaker E. (Shown consisting of a disk mounted on a shaft $b$.) Said disk has a number of projections or contact-points $d$, adapted to be engaged by contact-strips $e\ e'$. $e^2\ e^3\ e^4$, one for each transmitter, which contact-strips connect by wires $f\ f'\ f^2\ f^3\ f^4$ with the transmitters D D', &c., respectively.

$g$ is another contact-strip adapted to engage or electrically connect with the shaft $b$ or a hub on the same, the contact-strip $g$ being connected by a wire $g^2$ with a magnet F, that is in connection with the battery G by a wire $g^3$. The battery G is connected with the magnet B by a wire $B^2$, either directly or as hereinafter more fully shown.

$F^2$ is the armature of the magnet F, which armature in its normal position limits the movement of the circuit-breaker E, preferably by engaging a pin $g^4$ on the breaker E, as shown. A light spring $g^5$ keeps the armature $F^2$ in its normal position, and preferably holds it against a stop $g^6$.

$h$ is an arm connected to the shaft $b$, by means of which the shaft $b$ is turned. Said arm is to be actuated by a spring, as $h^2$, which tends to draw the arm $h$ against a stop $h^3$, and in so doing turns the breaker E, and thus breaks contact between the strips $e\ e'$, &c., and the circuit-breaker.

Whenever the magnet F is energized, its armature $F^2$ will be drawn down, thereby releasing the pin $g^4$ and the circuit-breaker E, which will then be turned by the spring $h^2$, and thus break connection between it and the several transmitters D D', &c. To restore the circuit, the arm $h$ should be lifted to turn back the breaker E to its normal position. This may be accomplished by means of a sliding rod $h^4$, which is shown guided in suitable bearings $h^5$, and which carries a dog $h^6$, so arranged that when the rod $h^4$ is drawn down it will restore the indicators, and the dog will slip past the arm $h$, but when the rod $h^4$ rises the dog $h^6$ will raise the arm $h$; but it is evident that the means for moving the arm $h$ and for turning the circuit-breaker E may be changed from that shown, if desired.

The wires $f$ $f'$ $f^2$, &c., from the circuit-breaker E lead to a contact-piece $i$ either directly or by a wire $i^2$ within the instrument.

$i^3$ is another contact-piece normally out of contact with the contact-piece $i$, which contact $i^3$ is electrically connected with a magnet H', which latter is in circuit with the main line $a$, either directly or through a magnet H, the magnet H' being shown connected by a wire $j$ with the magnet H, which latter is shown connected with the line-wire $a$.

I is the main crank or handle connected with the main driving mechanism of the transmitter, (only the wheel $j^2$ of which is shown in dotted lines, the rest of which mechanism may be of well-known or suitable construction,) to which crank is connected an arm or projection $I^2$, which is adapted, when the crank I is turned, to engage the contact-piece $i$, and thus throw it into engagement with the contact $i^3$. When the contacts $i$ and $i^3$ are thus brought together, the circuit is closed from the battery G, through $B^2$ B $a$ H $j$, to the magnet H', $i^3$, $i$, $i^2$, $f^2$, $e^2$, E, $g$, $g^2$, F, and $g^3$ to the battery. The magnet F thereby becoming energized draws the armature $F^2$ away from the pin $g^4$, thereby releasing the circuit-breaker E, which then turns to break connection between itself and $e$ $e'$ $e^2$, &c. The short circuit thus formed being now broken, the current next passes from the transmitter through the line $a$ to the magnet B to indicate the call or want on the indicator.

To prevent more than one call at a time from being recorded by the register, no matter how many transmitters may be started simultaneously, and to permit the calls from the transmitters that have been thus started to be recorded consecutively, I have provided the following arrangement in connection with the circuit-breaker E and its connections: The armature $G^2$ of the magnet H' has connected to it an arm or projection $G^3$, which is normally in engagement with the escapement $G^4$ of the call mechanism or a projection $G^5$, connected with said escapement, whereby the call mechanism will be held from movement after it is wound until the magnet H' is energized. J is a lever or stop, one end of which is normally held against the arm $I^2$ by a spring $l$, while its other end is held normally slightly out of engagement with the armature $G^2$. When now the crank I is turned, the arm $I^2$ will be withdrawn from the lever J, which will immediately contact the end of the armature $G^2$. If the magnet H' is now energized, it will actuate its armature to release the escapement $G^4$ to permit the call to be sent in, and the lever J will pass up in front of the armature $G^2$, and thus hold the projection $G^3$ out of engagement with the escapement until the arm $I^2$ returns and lifts the lever J to return it to its normal position to enable the armature to again hold the escapement in check. The magnet H' is only energized when the contacts $i$ and $i^3$ touch, whereupon the armature $G^2$ releases the call mechanism, and the circuit-breaker E then breaks the circuit and the armature $G^2$ becomes released from its magnet, but will not stop the mechanism until the call has been sent, because of the intervention of the lever J. Suppose now that the cranks in two or more transmitters—say D, $D^2$, and $D^4$—be pulled at precisely the same instant. The current will of course pass through the shortest and most direct route to the battery, and therefore will pass along the wire $f$ from the nearest transmitter D, whereby the armature $G^2$ in the transmitter D will act to release the call mechanism, and the armature $F^2$ will then release the circuit-breaker E, which now turns and breaks the connection between the circuit-breaker and all transmitters. As the current was short-circuited through the transmitter D and its wire $f$, it could not reach the magnets H' in the boxes $D^2$ and $D^4$, and thus the cranks I in said boxes remain set. As soon as the circuit is broken through E, as stated, it will pass along the main line $a$ and thus actuate the indicator. As soon as the call has been recorded from the nearest transmitter D the attendant actuates the slide $h^4$, which turns the circuit-breaker E back to the normal position, thus restoring the circuit through the wires $f$ $f^2$, &c. The current now immediately passes to the next nearest box, whose crank I has been pulled and retained set, and passes thence out through the wire $f^2$ to again actuate the armature $F^2$ to break the circuit through $f^2$. The current now passes along the line $a$ to indicate the call from $D^2$, while the instrument $D^4$ still remains set. The attendant again restores the breaker E to close the circuit through $f$ $f'$, &c., so that the armature $G^2$ in $D^4$ can act to release its escapement to permit the call to be sent in after the circuit through $f^4$ has been broken, and so on consecutively through any number of transmitters that may be set simultaneously or one after another.

From the above it will be seen that the call from a single transmitter will be indicated and also that no matter how many transmitters are pulled at one moment or one quickly after another only one call at a time will be received by the indicator, the other transmitters being held from transmitting their calls until the call from the transmitter nearest the indicator has been received.

The mechanism in the transmitter for sending the proper call may be of any suitable construction; but I prefer to use the mechanism shown in the drawings, which is as follows:

$m$ is a shaft driven by the wheel $j^2$ and suitably journaled in the transmitter. To the shaft $m$ is secured a wheel or disk L, having suitable teeth or circuit-breakers for sending the desired call. Upon the shaft $m$ is also hung a cam wheel or disk M, to which is connected a pointer O. The disk M may be turned independently of the wheel L and may also be turned by and with the wheel L. For this latter purpose the disk M has a number of teeth $m^2$, which are adapted to be engaged by a dog or the like $m^3$, carried by the wheel L. The dog $m^3$ engages the teeth $m^2$ sufficiently hard to cause the wheel L to carry the disk M with it, but yet to permit the disk N to be turned independently. The disk M has one part smooth or uncut, as at $m^4$. The wheel L also carries a stop $m^5$ to engage the disk M, and thus turn it at the proper time. The wheel L has a series of notches or circuit-breakers $n$ to transmit the call or message, and also other notches or circuit-breakers $n^2$ $n^2$, which are suitably grouped and spaced to send a call denoting the number of the room or transmitter—in the example shown the notches being in groups of nine, six, and four, suitably spaced by intervening metal, which indicates in the call "964."

P is a contact-strip, shown having two prongs P′ P², which rest, respectively, upon the wheel L and disk M. The contact P is in circuit with the line-wire $a$—say through the wire $j$ of the transmitter, as shown.

This call mechanism operates as follows: Suppose the call to be transmitted is for ice-water, which corresponds to, say, ten breaks on the part $n$ of the wheel L, which wheel L makes one revolution to send in a complete call. The pointer O is first turned to the section marked 10 in the drawing, which leaves, say, ten notches $n$ exposed between the point $o$ on the disk M and the end notch $n^5$. When now the wheel L is allowed to turn, the disk M will be carried with it, but no breaks will take place in the circuit so long as the prong P² rests on the smooth part $m^4$ of the disk M, as the current has a free passage through said prong; but as soon as the disk M has been turned by L far enough to pass from under the prong P² the breaks caused by the prong P′ and the notches $n$ will be sent along the line. After the call has been thus sent in the numbers will be similarly recorded by the notches $n^2$ and prong P′. When the disk M has been turned partly around, it will be arrested by a spring-dog $p$, that engages the edge $o^2$ of the disk M, the wheel L continuing to turn. When now the stop $m^5$ on the wheel L reaches the part $o$ of the disk M, it will cause the disk M to turn with the wheel L to bring the pointer O back to zero. By this means the pointer O is automatically returned to zero no matter how far it may have been turned to send in the desired call.

In order that a call may be sent from the indicator A or the main receiving-station through the several transmitters along the main line $a$ to ring a bell connected with said transmitters to indicate an alarm of fire, I have provided the following arrangement: The current passing from the battery G through the line B² $a$ in the direction of the arrows $x$ is preferably a positive current, and the armature R of the magnet H is polarized with a positive pole, so that it will not be actuated by the normal positive current passing through the magnet H.

In order that the armature R will be attracted to sound the bell S, a negative current must be sent through the line $a$ in the direction $x$. To reverse the current for said purpose and still permit the positive current to pass in the direction $x\ y$ when the bell S is not to be rung, I insert two contacts 2 and 3 in the line $a$.

4, 5, 6, and 7 are circuit-breakers carried by a shaft 8, insulated from each other and from said shaft. The strip 2 is adapted to contact the circuit-breaker 5, as is also and simultaneously therewith a contact-strip 9, which leads by a wire 11 to the negative pole of the battery G. The positive pole of the battery connects by a wire 12 with a contact-strip 13, adapted to engage the circuit-breaker 4. Another contact-strip 14, engaging the circuit-breaker 4, connects with the line B². When thus arranged, the current passes from the positive pole of the battery through 12, 13, 4, 14, B², B, and $a$, through the transmitters to 2, thence through 2, 5, 9, and 11 to the negative pole of the battery. The positive pole of the battery also connects by a wire 15 with a contact-strip 16, adapted to engage the circuit-breaker 7, (as is also the strip 3;) but 16 and 3 are normally out of contact with 7. The negative pole of the battery also connects by a wire 17 with a contact-strip 18, that is adapted to engage the breaker 6, (but normally out of contact therewith,) as is also a contact-strip 19, that connects by a wire 20 with the line-wire B². When now it is desired to ring the bell S, the circuit-breakers are given a partial turn, which breaks connection between 2 and 9 with 5 and between 13 and 14 with 4 and makes connection between 3 and 16 with 7 and between 18 and 19 with 6. The current now passes from the negative side of the battery through 11 17 18 6 19 20 B² B $a$ to the magnet H, which will immediately attract the positively-polarized armature R, and thus ring the bell. The current passes thence through the line $a$ to 3, 7, 16, and 15 to the positive pole of the battery. The armature R may be made to vibrate while the circuit remains closed in manner well known, or the circuit-breakers 4, 5, 6, and 7 may be rotated by hand or by suitable mechanism to make and break the circuit continuously to ring the bell. When the line is to be again used to transmit calls to the indicator, the circuit-breakers 4, 5, 6, and 7 should be turned back to the position shown in the drawings.

From the above it will be seen that the one line is used to send calls from the transmitters to the indicator and from the indicator to the transmitters, while when the call is passing from the transmitter to the indicator the bell S will not be rung.

The system above described can be readily placed in hotels where wires $ff'$, &c., have been already strung for other indicators.

To recapitulate, it will be understood that with my improved system, no matter how many transmitters are actuated at once, the call from only one at a time will be allowed to enter the indicator, and that all the transmitters will hold back their calls until the nearest one has sent in its call, and that as soon as said call has been received and the breaker E is restored by the attendant the call from the next nearest transmitter will pass into the indicator, and so on through the series of transmitters. The indicator to be used will of course be proportioned to the number of wires or transmitters in circuit, the indicator in the example shown being adapted to indicate from nine hundred and ninety-nine transmitters, besides exhibiting the call or want.

Of course it will be understood that my system can be used for messenger or telegraph calls, for fire-alarm, or other desired purposes; also, that where it is not desired to return an alarm or call to the transmitter the magnet and bell H S can be dispensed with, the line $a$ entering the transmitter leading directly to the magnet H', in which case the circuit-breakers 4 to 20 can be dispensed with and the main line connected directly with the battery G. Of course the mechanism 4 to 20 can be contained within the indicator A or in a separate receptacle, being shown separate from the indicator for convenience. One notch $n^5$ on the wheel L is preferably left permanently exposed beyond the edge $o$ of the disk M, so that if any transmitter is operated without the pointer O being first set to any "want" an impulse will be sent along the line to turn the want-wheel of the indicator one step, which may be utilized as a test call. If this were not the case, it is plain to be seen that were the transmitter of room 964 operated the first group 9 of the signal-wheel L would operate the want-wheel on the indicator, and the remaining two groups 6 and 4 would operate the first two number-wheels of the indicator. Thereby, instead of showing that the call came from room 964, the indicator would show that the call was apparently the ninth want from room 64.

Having now described my invention, what I claim is—

1. An indicating system comprising a normally-closed main line, an indicator actuated by the current in the main line, a series of transmitters in circuit therewith in said main line, the messages all being transmitted over said main line, separate independent short-circuit lines extending from the transmitters and normally out of electrical contact with the main line, and a circuit-breaker with which said lines are normally in contact and adapted to break said circuits when the current passes through one of said lines to cut out the short circuit and shift the current from the transmitters onto the main line to send in the call, substantially as described.

2. An indicating system comprising a normally-closed main line, an indicator actuated by the current in said main line, a series of transmitters in circuit with said indicator in said main line, the messages all being transmitted over said main line, separate independent short-circuit lines extending from each transmitter, said latter circuit being normally open in the transmitter, and a circuit-breaker connecting said short circuits, adapted to be actuated when a current passes through one of said short circuits, whereby when the short circuit is closed in more than one transmitter at a time the current will traverse the nearest short-circuit line to break all short circuits and prevent the call from being sent from any other transmitter until the call from said nearest transmitter has been recorded, substantially as described.

3. An indicating system comprising an indicator, a main line for actuating the indicating mechanism, a series of transmitters in circuit with said main line, normally-open short-circuit lines extending from said transmitters, a magnet in each transmitter in said short circuit and electrically connected with the main line for controlling the mechanism in the transmitters, and an automatic circuit-breaker connected with and operated by said short circuits for breaking all of said short circuits after one or more transmitters have been set, so that the call from but one transmitter can be recorded at once, substantially as described.

4. An indicating system comprising an indicator, a series of transmitters in circuit therewith, normally-open short circuits connecting said transmitters with a circuit-breaker, a magnet in said short circuit for releasing or actuating said circuit-breaker, a magnet in the transmitter in the short circuit for controlling the mechanism of the transmitter, and an arm or the like for closing the short circuit to send a current through the short circuit to actuate the circuit-breaker and cut out the short circuits to prevent more than one call from being recorded at a time, substantially as described.

5. An indicating system comprising an indicator, a main line for actuating the mechanism of said indicator, a series of transmitters in circuit in said main line, a short-circuit line extending from each of said transmitters, normally-open contacts in each short circuit, a magnet also in said short circuit and controlling the mechanism in the transmitter, an arm or the like for closing said short circuit, a circuit-breaker in circuit with said short circuits and normally in contact therewith, and a magnet in said short circuit for releasing said circuit-breaker to cut out all of said short circuits, substantially as described.

6. A transmitter in circuit in a main line, a short-circuit wire extending from the transmitter and normally open, but adapted to be switched into said main line to short-circuit it, and a magnet, as H', having one leg only connected with the main line, its other leg leading to connections for closing said short circuit, the transmitting mechanism in said transmitter being normally held in check by the armature of said magnet until a current passes through said short-circuit line to actuate the armature and release said transmitting mechanism, substantially as described.

7. A transmitter mechanism and a normally-closed main line in circuit therewith, a short-circuit wire extending from said transmitter, but normally open in said transmitter and normally in circuit with said main line outside of said transmitter, a circuit-maker in said transmitter for closing said short circuit, and a circuit-breaker in said short circuit for breaking the short circuit after it is closed in said transmitter to shift the current onto the main line after it has passed through the short circuit and broken it, substantially as described.

8. An indicator, a normally-closed main line with which the indicator is in circuit, a series of transmitters in circuit in said main line, a short-circuit wire extending from each transmitter, a circuit-breaker, as E, normally in contact with the terminals of said short circuits, a magnet F in circuit with said breaker E, the armature $F^2$ for said magnet holding the breaker E in its normal position, a driving mechanism for turning said breaker when said armature releases it, and a restorer for returning said breaker to its normal position, substantially as described.

9. A normally-closed main line and a short circuit therefor, combined with a circuit-breaker E, engaging the terminal of said short circuit, a spring for turning said breaker E to break the short circuit, a magnet F in circuit with said circuit-breaker E, the armature $F^2$ of said magnet holding said breaker in its normal position against the tension of said spring, and a restorer for returning the breaker E to its normal position, substantially as described.

10. In a transmitter, a call-sending mechanism, a magnet in a normally-open circuit and its armature, said armature holding the call mechanism in check when the magnet is not in circuit and releasing said mechanism as soon as the magnet is in circuit, a stop for holding said armature away from said call mechanism while the call is being transmitted, and an arm or the like connected with the crank of the call mechanism for controlling the movement of said stop and for closing said circuit, substantially as described.

11. In a transmitter, a call-sending mechanism, a magnet H' in a normally-open short circuit, and an armature for said magnet adapted to hold the call mechanism in check until a current passes through said magnet, combined with a stop for holding said armature out of engagement with the call mechanism after the magnet releases the armature, and with an arm or the like connected with the call-mechanism handle for actuating said stop and for closing said short circuit, substantially as described.

12. In a transmitter, a call-sending mechanism, a magnet in a normally-open circuit, contacts $i$ $i^3$ in said circuit and normally separated, and an armature for said magnet, which armature normally holds the call-sending mechanism in check, combined with an arm or the like to join the contacts $i$ $i^3$ to close the circuit and operate the armature to release the call-sending mechanism and with a stop J, normally held by said arm out of engagement with said armature, but adapted to hold said armature after the magnet attracts it and while said arm is out of engagement with said stop, substantially as described.

13. In a transmitter, the combination of a call-sending mechanism containing an escapement or regulator, a projection $G^5$, connected therewith, an armature to engage said projection, a magnet to actuate said armature, and a normally-open circuit containing said magnet with the lever J, arm $I^2$ to engage said lever and close said circuit, and call-actuator I, connected with said arm $I^2$, substantially as described.

14. In a transmitter, a rotating circuit-wheel L and a disk or cam M, adapted to be actuated independently of and rotated by and with said wheel L, the wheel L being provided with circuit-breaking notches, and the disk M having a plain surface to regulate the number of impulses to be sent by the wheel L, in combination with contacts that are electrically connected for said wheel and disk, substantially as described.

15. A circuit-wheel having notches $n^2$ to write a number and notches $n$ to write a call, combined with a cam or disk having a smooth surface to correspond with the notches $n$ and with contacts P' $P^2$ for said wheel and disk, respectively, said contacts being electrically connected, whereby said disk can be turned to expose the desired number of notches to the contact P', substantially as described.

16. A circuit-breaking wheel, combined with an independently-movable circuit cam or disk, connections between said wheel and disk for driving said disk by said wheel, and with contacts P' $P^2$, electrically connected together, for said wheel and disk, respectively, substantially as described.

17. A circuit-breaking wheel carrying a dog, as $m^3$, combined with a circuit cam or disk having one part smooth and one part toothed for engagement with said dog, and with contacts P' $P^2$, substantially as described.

18. A circuit-breaking wheel, combined with a circuit cam or disk and connections for turning said disk by said wheel, and with a dog or stop, as $p$, to check the movement of said disk by said wheel, substantially as described.

19. A circuit-breaking wheel, combined with a circuit cam or disk having independent movement, a flexible connection between said wheel and disk for turning said disk by said wheel, a dog or stop for limiting the turning of said disk by said connection, and a rigid projection on said wheel for turning the disk after it has been stopped by said dog to return the disk to its normal position, substantially as described.

20. The combination of the circuit-wheel L, carrying dog $m^3$ and pin $m^5$, with the circuit cam or disk M, movable independently of the wheel L and having teeth $m^2$, and with the dog or stop $p$ to hold said disk, substantially as described.

21. The circuit-wheel L, the shaft $m$, carrying it, and the dog $m^3$ and pin $m^5$ on said wheel, in combination with the circuit cam or disk M, mounted loosely on the shaft $m$ and having the smooth part $m^4$ and teeth $m^2$, pointer O for turning said disk, dog or stop $p$, and contacts P' P², substantially as described.

22. A battery and a line-circuit connected therewith, combined with circuit-breakers 4 5, the pair of contacts 13 14, engaging the breaker 4, the contact 13 leading to a pole of the battery and the contact 14 leading to the main line, and the contacts 2 and 9, engaging the breaker 5, the contact 9 leading to another pole of the battery, the contact 2 leading to the line, substantially as described.

23. The combination of a battery, circuit-breakers 4, 5, 6, and 7, contact 13, connected with one pole of the battery and adapted to engage the breaker 4, contact 14, adapted to engage the breaker 4 and connected with a main-line circuit, circuit-breaker 9, adapted to engage the breaker 5 and connected to the opposite pole of the battery, contact 2, adapted to engage the breaker 5 and connected to the opposite end of the main line, contact 16, normally out of engagement with breaker 7 and connected with the same pole of the battery as contact 13, contact 3, normally out of contact with breaker 7 and connected to the same end of the line as contact 2, contact 18, normally out of engagement with breaker 6 and connected with the same pole of the battery as contact 9, and contact 19, normally out of engagement with the contact 6 and connected with the same end of the main line as the contact 14, whereby when the contacts 13 14 and 2 and 9 engage the breakers 4 and 5, respectively, a current of one polarity will flow from the battery, and when connection between 2, 9, and 5 and 13, 14, and 4 is broken and connection is made between 3, 7, and 16 and 6, 18, and 19 a current of opposite polarity will flow from the battery, substantially as described.

24. A circuit-breaking wheel having want-notches $n$, combined with a circuit disk or cam M to regulate the number of impulses to be sent by the circuit-wheel, the first of said notches $n$ being left permanently exposed beyond the point $o$ on the disk M for the purpose of insuring the action of the wheel of the indicator whenever a transmitter is operated without the pointer O having been set to indicate a want, substantially as described.

FRANK B. WOOD.

Witnesses:
THEO. W. BAYAUD,
STEPHEN J. MCCRIMLICK.